Nov. 4, 1958　　　　J. GUTHRIE　　　　2,858,657
WRAPPER APPLICATING APPARATUS
Filed Oct. 6, 1954　　　　　　　　　　9 Sheets-Sheet 1

Fig. 1.

INVENTOR
JOHN GUTHRIE
BY
Fetherstonhaugh & Co.
ATTORNEYS

Nov. 4, 1958

J. GUTHRIE 2,858,657

WRAPPER APPLICATING APPARATUS

Filed Oct. 6, 1954

INVENTOR
JOHN GUTHRIE
BY
Fetherstonhaugh & Co.
ATTORNEYS

Nov. 4, 1958   J. GUTHRIE   2,858,657
WRAPPER APPLICATING APPARATUS
Filed Oct. 6, 1954   9 Sheets-Sheet 4

Fig.4.

INVENTOR
JOHN GUTHRIE
BY
Fetherstonhaugh & Co.
ATTORNEYS

Nov. 4, 1958  J. GUTHRIE  2,858,657
WRAPPER APPLICATING APPARATUS
Filed Oct. 6, 1954  9 Sheets-Sheet 8

INVENTOR
JOHN GUTHRIE
BY
Featherstonhaugh & Co.
ATTORNEYS

Nov. 4, 1958    J. GUTHRIE    2,858,657
WRAPPER APPLICATING APPARATUS
Filed Oct. 6, 1954    9 Sheets-Sheet 9

INVENTOR
JOHN GUTHRIE
BY
Fetherstonhaugh & Co.
ATTORNEYS

United States Patent Office 2,858,657
Patented Nov. 4, 1958

2,858,657

WRAPPER APPLICATING APPARATUS

John Guthrie, Woodfibre, British Columbia, Canada, assignor to Alaska Pine & Cellulose Limited, Vancouver, British Columbia, Canada, a corporation of British Columbia Application October 6, 1954, Serial No. 460,686

24 Claims. (Cl. 53—218)

This invention relates to apparatus for applying wrappers to bundles of different dimensions.

This apparatus is particularly designed for wrapping relatively large bundles, such as pulp bales, but it is to be understood that it may be constructed to wrap different materials of different sizes. Once the wrappers are applied to the bundles, they may be held thereon by any desired means, such as baling wire, steel bands, glued tape, or the like.

Bundling machines are known, but most of these take up considerable floor space since the wrappers are applied through a number of stages located throughout the apparatus. The present apparatus requires comparatively little floor space since the wrapper is completely applied to the bundle while the latter remains in one location. Furthermore, the various steps of folding the wrapper around the bundle may be accomplished in quick succession, so quick, that they are almost simultaneous.

The wrapper may be formed of paper, cardboard or other material, and it may consist of one or more thicknesses of material, although only one thickness will be referred to herein for the sake of convenience.

According to this invention, the wrapper consists of a lower and an upper sheet of material applied to the bottom and the top of the bundle being wrapped. The apparatus includes a table upon which the lower sheet of material may be placed, and the bundle directed on to this sheet centrally thereof. If it is necessary to turn the bundle during the application of suitable ties thereto, means may be provided in the table for raising the bundle sufficiently clear of the latter to be turned into the desired position. Alternatively, the bundle may be placed on the lower sheet before reaching the table, in which case they are directed on to the latter together.

Once the bundle and the lower wrapper sheet are located on the table, an upper wrapper sheet is applied to the top thereof in any convenient manner. This sheet is so placed on the bundle that the latter is located centrally of the sheet. Folding apparatus is provided for folding the edges of one sheet upwardly and the edges of the other sheet downwardly over the adjacent sides of the bundle. This may be done progressively or simultaneously, depending upon the size of the sheets relative to the bundle. The folding apparatus holds the sheets in position and these are now in substantially tubular form around the bundle. It is preferable that the corresponding edges of the two sheets overlap, in which case the folding must take place progressively, but if the bundle is not to be completely enclosed, there may be a gap between the corresponding sheet edges so that the sheets just provide top and bottom covers for the bundle and the folding may be progressive or simultaneous. Additional folding or tucking apparatus is provided for folding the sides of opposite ends of the tube inwardly over the ends of the bundle. This leaves flaps projecting outwardly from the top and bottom of each end of the bundle. Further folding apparatus fold the two bottom flaps upwardly and the two top flaps downwardly. Here again, this may be done successively or simultaneously. If the top and bottom flaps at each end of the bundle overlap when folded, the folding must be progressively done, but if they do not overlap, the folding may take place simultaneously. The various folding means referred to above firmly hold the wrapping in place around the bundle. Any suitable means may now be used to secure the wrapper on the bundle or package. For example, wire bale ties may be used. However, the application of the tying means does not form part of this invention.

The various forms of folding apparatus employed in this machine are slightly different from each other mainly because of the different folding operations they perform and because of their location in the machine. However, they all employ the same principle. Each folding apparatus includes means for moving it towards a corner, either horizontal or vertical, of the bundle. Each of these folders includes a flat member pivotally mounted on a suitable support, and a guide finger projecting outwardly therefrom at the pivot end substantially at right angles thereto. Resilient means is provided for retaining the folding member in an open or inoperative position. When the folder is moved towards the bundle, the folding member engages a portion of a wrapping sheet projecting from an edge of the bundle. This folding member presses said projecting portion towards the edge of the bundle. Eventually, the projecting finger engages a surface of the bundle lying in a plane at right angles to the last-mentioned edge, or a stop in the machine. As the folder continues to move, the finger swings the folding member to a closed position, this action moving the portion of the sheet engaged by the folder towards said bundle edge. The finger and folding member form a right angle clamp which fits around a corner of the bundle to hold the wrapping sheet around said corner.

Some of the folders move upwardly through the table, others move downwardly from the position above the bundle, and still others move more or less horizontally towards the bundle.

An example of this invention is illustrated in the accompanying drawings, in which, Figure 12 is an enlarged vertical section taken on the line 12—12 of Figure 11, Figure 13 diagrammatically illustrates a bundle with lower and upper wrapper sheets applied thereto ready to be wrapped therearound, Figure 14 diagrammatically illustrates two steps in the folding process, Figure 15 diagrammatically illustrates the bundle with the wrapper sheets partially folded around it in tubular form, and Figures 16 and 17 diagrammatically illustrate two more successive folding steps.

Figure 5:
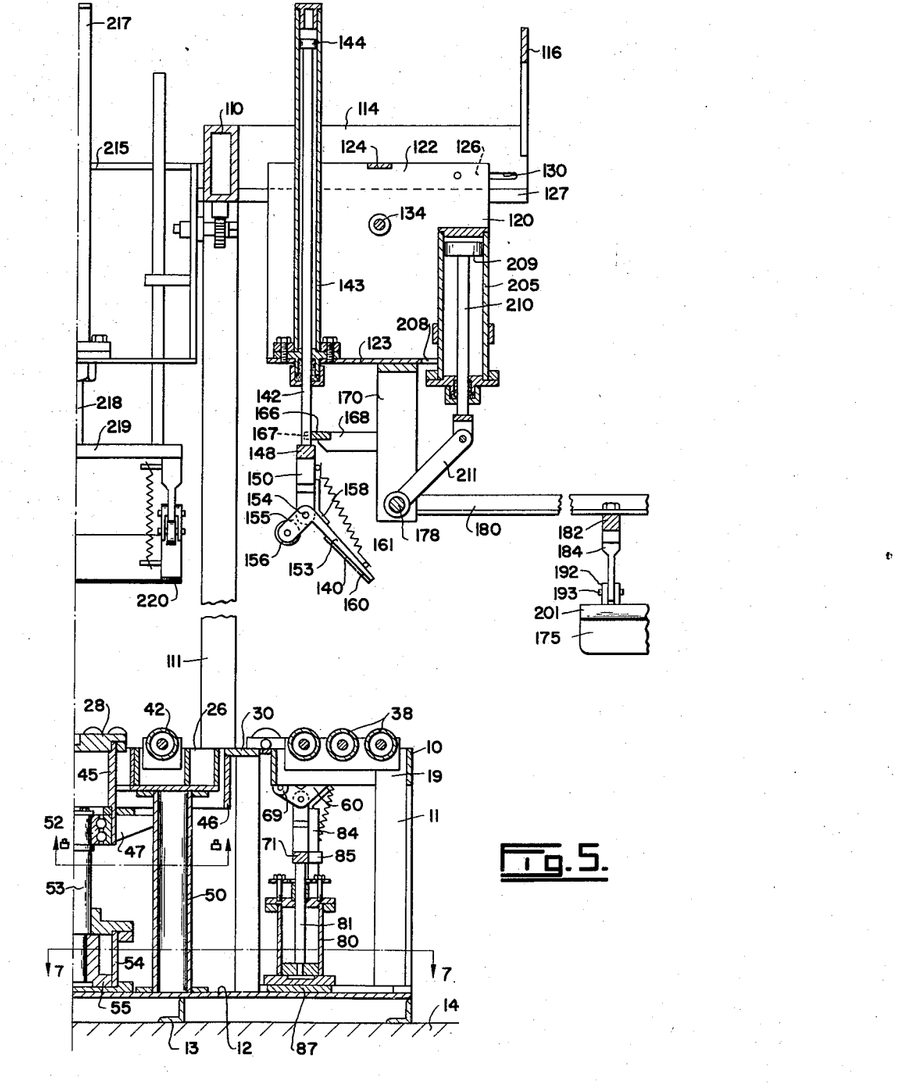
Figure 5 is an enlarged vertical section taken substantially on the line 5—5 of Figure 1.
Figure 6:
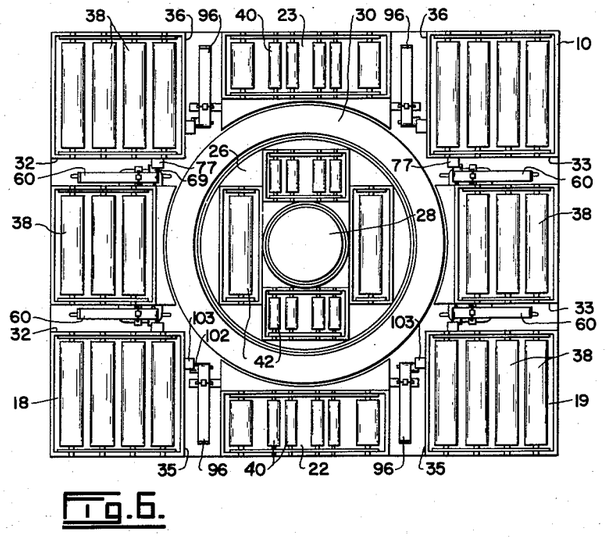
Figure 6 is a plan view of the apparatus table only.

Referring to the drawings, 10 is a horizontal table carried by a plurality of vertical supports 11 mounted on a base 12 which is preferably on beams 13 to space it above the floor 14, see Figure 5. This table has end sections 18 and 19, and side sections 22 and 23. A fixed section 26 is located centrally of the table, while bundle elevating means is provided by a central platform 28 and a circular flange 30 spaced from and concentric with the latter. The platform and flange are connected in the manner described later. Aligned slots 32 and 33 are formed in the end sections 18 and 19, respectively, and in this example, there are two spaced aligned slots. Each slot 32 in one section is aligned with a slot 33 in the other section. Similarly, aligned slots 35 and 36 are formed respectively in the side sections 22 and 23 of the table, there being two of these slots in the illustrated form of the invention. A plurality of rollers 38 are mounted in the end sections 18 and 19 of the table, a plurality of rollers 40 are mounted in the side sections 22 and 23, and a plurality of rollers 42 are mounted in the stationary central section 26, said rollers being parallel to each other and forming the upper surfaces of their respective sections.

Figure 8:
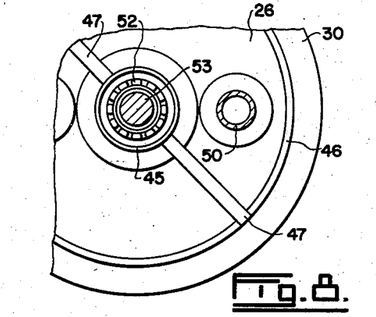
Figure 8 is another fragmentary horizontal section taken on the line 8—8 of Figure 3.

By referring to Figures 5 and 8, it will be seen that the central platform 28 has a depending sleeve 45, while the flange 30 has a concentric depending sleeve 46, said sleeves being connected by a plurality of spaced webs 47 extending therebetween. The central section 26 of the table is carried by a plurality of vertical supports 50 extending upwardly from the base 12. These supports extend between the webs 47 and are so positioned that platform 28 and flange 30 may be rotated through an angle of at least 90°.

The sleeve 45 is rotatably mounted through a suitable bearing 52 on the upper end of a ram 53 which slidably extends through the top of a hydraulic cylinder 54 where it is connected to a piston 55 mounted in the latter, see Figure 5. Suitable means, not shown, is provided for directing fluid into this cylinder to raise and lower the piston and, consequently, the platform 28 and flange 30 as a unit so that they may be elevated above the level of the rollers forming the top of the table 10.

Figure 10:
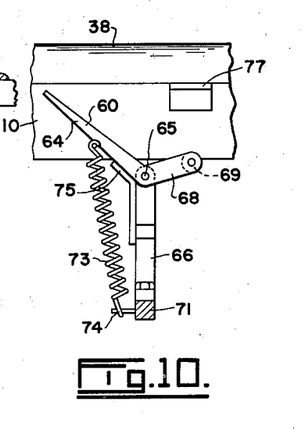
Figure 10 is a section taken on the line 10—10 of Figure 4.

A folder 60 is mounted in each of the two slots 32 of the end section 18 of the table. These are identical, and the same reference numerals have been used to designate corresponding parts in them. Folder 60 is shown in detail in Figure 10. This folder includes a flat folding member 64 pivotally mounted at one end thereof at 65 on a vertical holder or support 66. A finger 68 is connected to this member at the pivot thereof and projects outwardly therefrom substantially at right angles thereto. The finger has a bearing at its outer end which, in this case, is a roller 69 at the finger end projecting laterally therefrom. The bearing roller actually forms part of the finger. The support 66 is mounted on an end of a horizontal supporting arm 71, see also Figure 4. Suitable resilient means, such as a spring 73, is connected at one end to the member 64 at a point spaced outwardly from the pivot thereof, and at its opposite end to the arm 71 at 74. This spring normally holds the member against a stop 75 and at an angle to the vertical, as clearly shown in Figure 10. This is an open or inoperative position. A stop 77 is mounted on a part of the table 10 within slot 32 spaced above and in line with the bearing roller 69 when the folder is in its normal position within the slot below the surface of the table.

Figure 2:
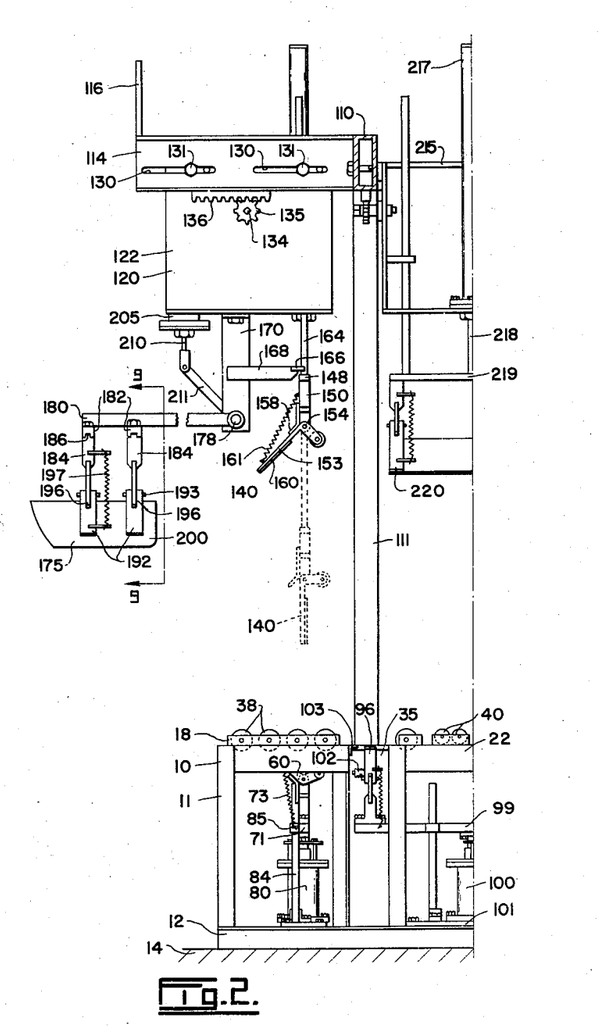
Figure 2 is a side elevation of one half the apparatus.

There may be only one folder 60 on the horizontal arm 71 or there may be several, depending upon the weight and quality of the wrapping material used. In this example, there is a folder 60 on each end of the arm, and suitable means is provided for raising and lowering said folders, see Figures 2, 4 and 10. In this case, it is done hydraulically by means of a cylinder 80 having a ram 81 projecting upwardly therefrom and connected to arm 71 at 82 substantially midway between the ends thereof, as clearly shown in Figure 4. Suitable means, not shown, is provided for directing fluid to and from the cylinder to raise and lower the arm and the folders. If desired, a pair of vertical guide bars 84 may project upwardly from the base 12 past the arm on opposite sides of cylinder 80. This arm has a loop 85 slidably fitting each of these guide bars.

From the description so far, it will be seen that there is a pair of folders 60 in the slots 32 of the end section 18 of the table. These folders are raised and lowered simultaneously by means of the hydraulic cylinder 80 to carry on a folding operation.

As an identical folding operation takes place at the opposite end of the table, one or more folders 60 are mounted in the slots 33 of the end section 19. The two illustrated folders are mounted and operate in exactly the same manner as the previously-described folders. Thus, there are four folders 60 associated with the table and these may be arranged to operate simultaneously, or the folders at one end of the table may operate after those at the opposite end thereof.

Figure 7:
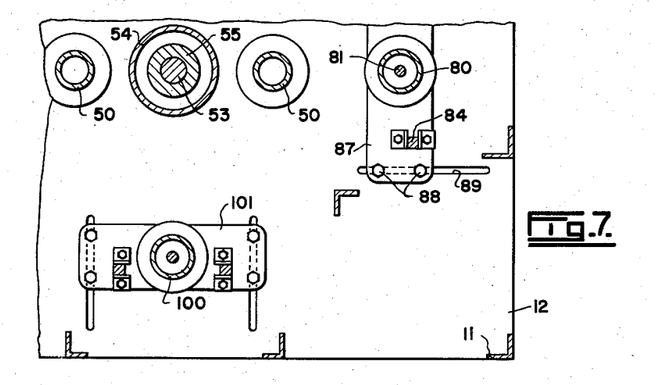
Figure 7 is a fragmentary horizontal section taken on the line 7—7 of Figure 5.

As it is desirable to be able to adjust the folders 60 at each end of the table towards and away from the centre of the latter, the cylinder 80 and guide bars 84 of each pair of folders may be mounted on a plate 87 which is slidable on base 12, see Figure 7. Bolts 88 at opposite ends of this plate extend down through spaced parallel slots 89 in the base. Nuts, not shown, are threaded on the lower ends of the bolts so that the plate may be tightened in different positions on the base.

As each arm 71 is raised, the bearing rollers of the two folders carried thereby engage the stops 77 aligned therewith and swing the folding members 64 from their angular positions towards vertical planes. When the folders are moved downwardly, the rollers disengage the stops and permit springs 73 to return the folding members to their normal angular positions.

Folders similar to those just described are mounted in the aligned slots 35 and 36 in the two side sections of the table. Here again, there may be one or more of these folders at each side of the table. Two folders 96 are located in slots 35 in the side section 22. Each of these folders are exactly the same as the folder 60 described above, and they are mounted on the opposite ends of a horizontal arm 99 which is raised and lowered by a hydraulic cylinder 100 mounted on a plate 101, which in turn, is adjustably mounted on the base 12, see Figure 7. Bearing rollers 102 of these folders engage stops 103 mounted on the table in line with said rollers when the folder is elevated.

Another pair of folders 96 are mounted in slots 36 in the side section 23 of the table. These are constructed and operate in exactly the same manner as the folders already described.

Figure 3:
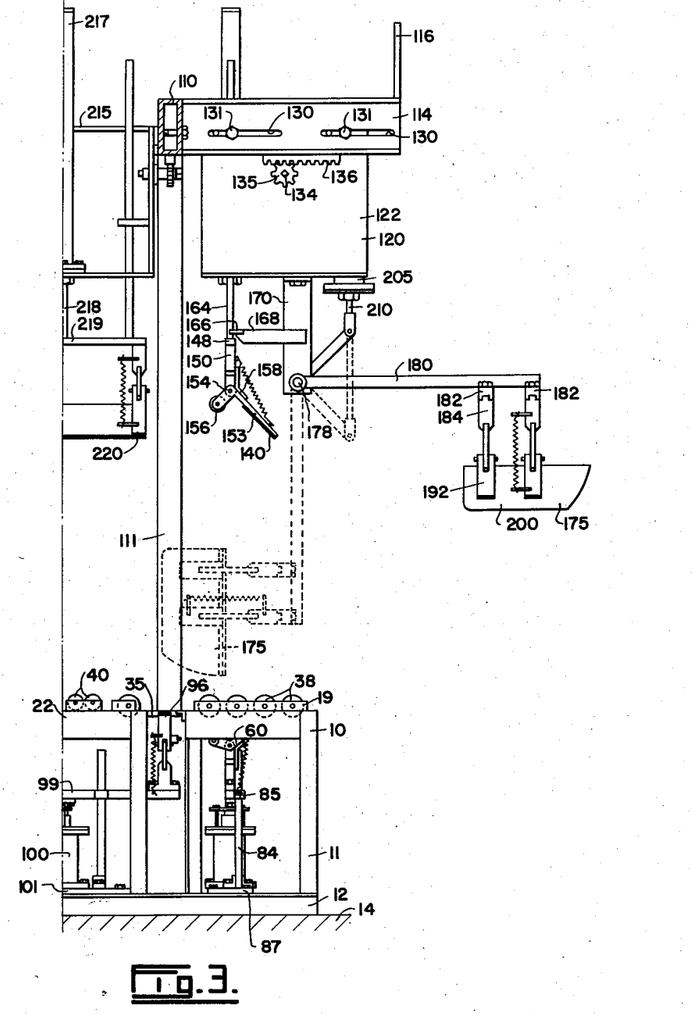
Figure 3 is a view similar to Figure 2 of the other half of the apparatus.

The folders described so far are for the lower wrapper sheet of a bundle. Another set of folders is supported above the table in any convenient manner for the upper wrapper sheet. In this example, a pair of beams 110 extend across the table and are supported well above the latter at their opposite ends by standards 111. A pair of spaced short beams 114 extend outwardly from the side of each of the beams 110, these short beams projecting beyond the ends of the table, as clearly shown in Figures 1, 2 and 3. If desired, the outer ends of each pair of beams 114 may be connected by an arch 116 to keep them equally spaced throughout the length thereof. Each pair of beams 114 carries folders for a horizontal corner of a bundle and for two vertical corners thereof.

As the elements carried by the two pairs of beams are identical, only one set will be described herein, and the same reference numerals are used for the corresponding parts in both sets.

Referring particularly to Figures 2 to 5, a carriage 120 is slidably mounted in any suitable manner upon and extends downwardly from each pair of beams 114. In this example, the carriage consists of a pair of spaced side plates 122 connected at their lower edges by bottom 123 and at their tops by a strap 124. Each side plate 122 has a bearing member 126 along the outer side thereof near its top which slidably rests upon a rail 127 secured to and extending longitudinally of the adjacent beam 114. Aligned slots 130 are provided in each beam through which set screws 131 extend, said screws being threaded into the adjacent side plate 122 of the carriage. When the set screws are loosened, the carriage may be moved longitudinally of the beams and of the table 10, after which the screws are tightened to secure it in the adjusted position.

The carriage may be moved directly by hand, or, as shown, a transverse shaft 134 may extend across the carriage and be journalled in the plates 122, said shaft having a pinion 135 and each end thereof meshing with a rack 136 extending longitudinally of one of the beams 114. When this shaft is turned, and this may be done by means of a crank, not shown, fitted on the end of the shaft, the pinions move along the racks to shift the carriage longitudinally of the beams.

A folder 140, similar to the folders previously described, is mounted for vertical movement on the carriage 120. The illustrated folder is mounted on the lower end of a piston rod 142 which extends into a cylinder 143 secured to the carriage bottom 123 and projecting upwardly therefrom. This rod is connected to a piston 144 slidably mounted in the cylinder. Hydraulic means, not shown, is provided for raising and lowering the piston on its cylinder, thereby raising and lowering folder 140.

A horizontal supporting arm 148 is mounted on the lower end of rod 142 substantially midway between the ends of the former. A holder or support 150 projects downwardly from each end of the arm 148, and a flat folding member 153 is pivotally mounted at one end thereof at 154 on each holder. Each member has an outwardly-projecting finger 155 secured thereto at the pivot thereof, and this finger carries a bearing roller 156 at its outer end. A stop 158 is provided on each holder 150 normally to retain the member 153 in an angular position, that is, at an angle to the vertical plane passing through the pivot thereof. By referring to Figure 4, it will be seen that there is a member 153 suspended below each end of the horizontal bar 148. These members may work independently of each other as separate folders or, as preferred, they may be connected by a flat folding plate 160 so that they act as a single folding member. A spring 161 is connected at one end to this plate and at its opposite end to the arm 148, and normally holds the members 153 in an open position against the stops 158. If desired, there may be one or more independent folding members supported by the horizontal bar.

Figure 4:
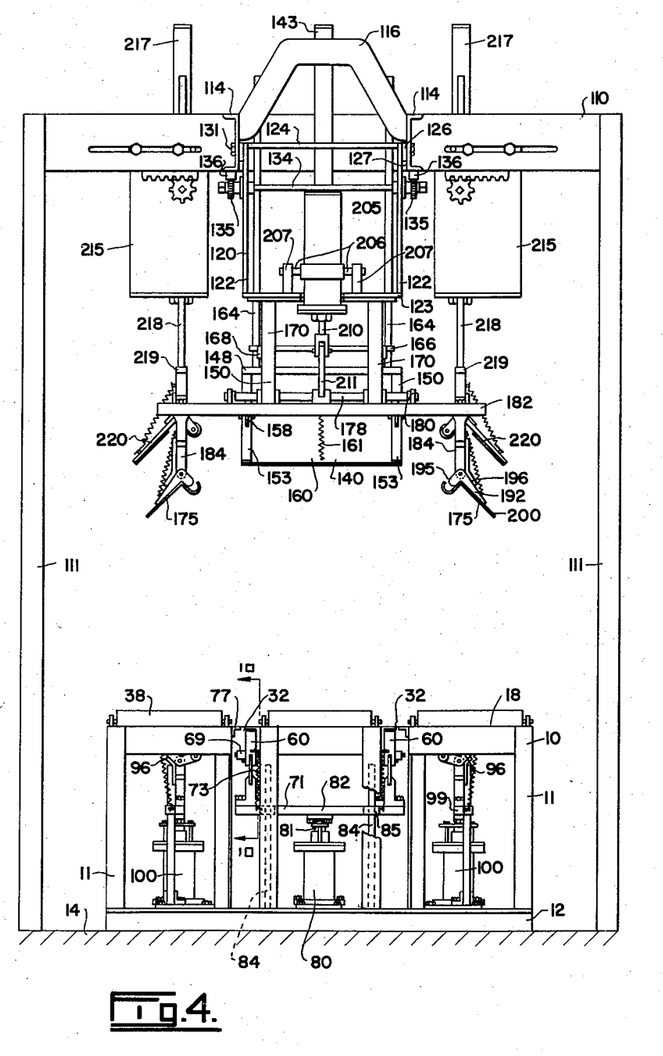
Figure 4 is an end elevation of the applicator.

A pair of guide rods 164 extend upwardly from the horizontal arm 148 near the ends thereof and slidably through the bottom 123 of the carriage, see particularly Figure 4. If desired, a guide bar 166 may slidably bear against the guide rods 164 and piston rod 142 at a point below the carriage bottom, said bar being provided with notches 167 in the edge thereof for accommodating said rods. The bar 166 is carried by horizontal supports 168 which are secured to and extend inwardly from brackets 170 depending from the carriage bottom, see Figure 5.

Folder 140 will hereinafter be referred to as a horizontal corner folder.

A pair of vertical corner folders 175 are positioned below and carried by the carriage 120. As these two folders are identical, the same reference numerals will be used on corresponding parts in both of them.

Figure 9:
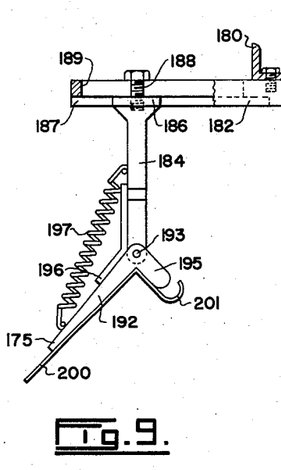
Figure 9 is a section taken on the line 9—9 of Figure 2.

A horizontal shaft 178 is journalled in and extends through the brackets 170 near the lower ends thereof. A pair of supporting arms 180 are fixedly secured to this shaft, one at each end thereof, and normally lie substantially in a horizontal plane, as clearly shown in Figures 2, 3 and 5. The supporting arms 180 carry a pair of spaced horizontal supporting arms 182 adjacent their outer ends. A pair of holders 184 are slidably mounted on the arms 182, one on each arm, as clearly shown in Figure 2. Each holder has a tongue 186 at its upper end slidably mounted in a slot 187 extending longitudinally of its arm 182, see Figure 9. A set screw 188 extends downwardly through another slot 189 in the arm above and parallel with slot 187. This set screw is threaded into the tongue of the holder. When the screw is loosened, the holder may be adjusted longitudinally of the arm, and when the screw is tightened, the holder is fixed to the arm.

A flat folding member 192 is pivotally mounted at one end at 193 on each holder 184. This member has a finger 195 projecting outwardly therefrom at its pivot substantially at right angles thereto. A stop 196 on holder 184 retains each member 192 in an angular position, that is, in a plane at an angle to the vertical plane passing through the pivot 193. A spring 197 connected at its opposite ends to one of the members 192 and the holder 184 thereof normally retains the member in an open position against said stop. The members 192 may act as independent folders or, as preferred, a flat folding plate 200 extends between and beyond the members so that the latter, combined with the plate, act as a single folder. The fingers 195 of the two members 192 may have bearing rollers at their outer ends similar to those of the previously-described folders, or they may have a curved bearing surface 201 connected thereto which, in this case, is formed by a portion of the plate 200 which is bent to form said curved surface, see Figure 9.

If desired, one of the arms 182 and the parts associated with it may be omitted. In this case, one folding member and the finger thereof would support and move plate 200. In fact, for small packages, the plate may be omitted.

Suitable means is provided for swinging the supporting arms 180 from their normal horizontal position to substantially a vertical position. This may be accomplished by means of a hydraulic cylinder 205 pivotally mounted by trunnions 206 in a pair of bearings 207 supported by and projecting upwardly from the bottom 123 of carriage 120, see Figures 4 and 5. This cylinder lies in a substantially vertical plane and projects downwardly below the carriage bottom through an opening 208 therein. A piston 209 is slidably mounted in this cylinder and has a piston rod 210 projecting downwardly through the lower end of the cylinder where it is pivotally connected at one end of a lever 211, the opposite end of which is fixedly connected to shaft 178, see Figure 5. This lever extends upwardly and is inclined relative to the arms 180 when the latter are in their horizontal position. Suitable hydraulic means, not shown, is provided for moving the piston 209 up and down in its cylinder to raise and lower the folders 175 carried by these arms.

Figure 1:
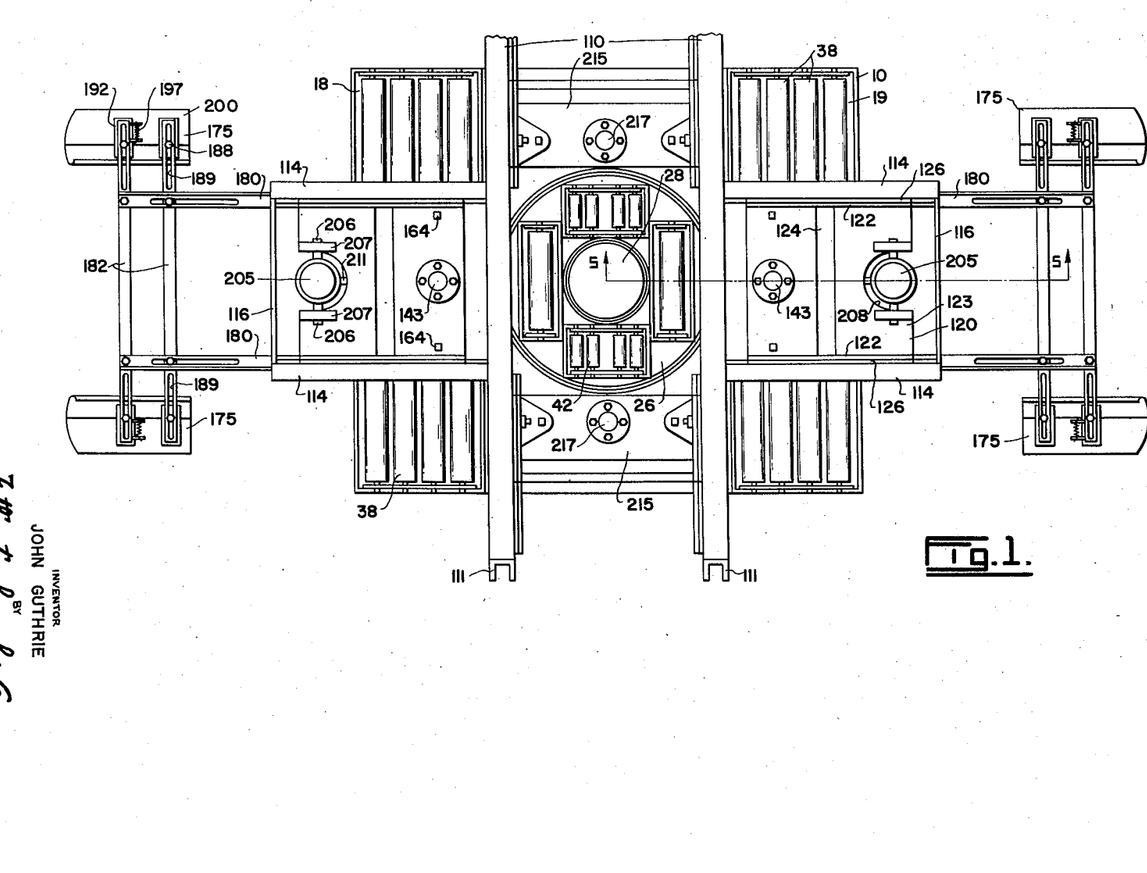
Figure 1 is a plan view of the wrapper applicating apparatus.

By referring to Figures 1 and 4, it will be seen that there are two folders 175 mounted on the horizontal arms 182, said folders being adjustable towards and away from each other in order that they may be applied to bundles of different sizes. The mountings of these folders provide for adjustment transversely of the machine, whereas the movable carriages 120 at opposite ends of the machine provide adjustment longitudinally of the latter. Horizontal corner folders 140 are intended to fold the sides of the top wrapper sheet against the adjacent edges of the bundle, whereas the vertical corner folders 175 are to tuck in the sides of the tubular ends of the wrapper which have been formed by prior folding operations. The folders mounted in the table 10 will fold the opposite sides and opposite ends of the lower wrapper sheet upwardly.

It is desirable to provide additional folders for folding the remaining sides of the upper wrapper sheet downwardly. For this purpose, carriages 215 are slidably mounted on the beams 110 adjacent both ends thereof so that they are above the opposite sides of table 10. As the carriages 215 and the parts associated therewith are identical, only one will be referred to in detail. In addition to this, each carriage is substantially the same as carriage 120 so that it will be only briefly described herein.

The carriages 215 are shown most clearly in Figures 4 and 5. Each carriage 215 is slidably mounted on the beams 110 in the same manner as the carriages 120 are mounted on beams 114. Carriage 215 has a vertical cylinder 217 from the lower end of which a piston rod 218 projects to carry a horizontal arm 219 upon which a horizontal corner folder 220 is mounted, said folder being exactly the same and mounted in the same manner as folder 140. This arrangement provides a horizontal corner folder above each side of the table 10 and which is movable towards and away from said table. There are two of these folders and they are movable towards and away from each other in order to be adjusted to bundles of different sizes.

As previously stated, this machine may be used to wrap bundles of different sizes. It is, however, primarily designed to handle bundles which are substantially in cube shape. The four sides or edges of the bundle may be of the same length or two edges may be sides and the other two ends. For the sake of convenience, a bundle having two sides and two ends will be referred to.

*Operation*

Figure 13:
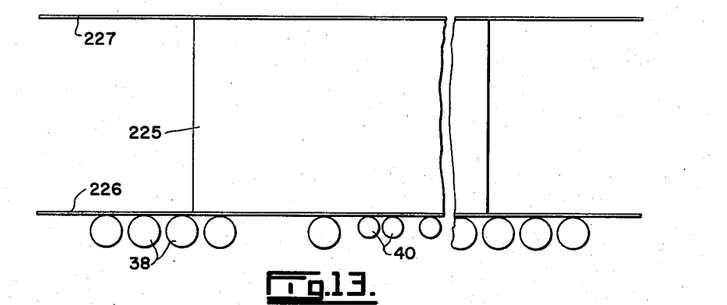
Figure 14:
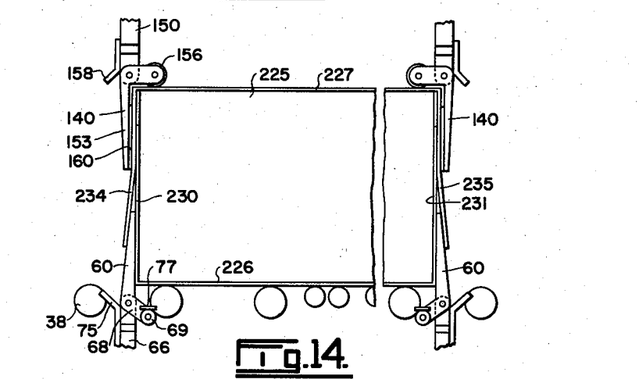

Figures 13 to 17 diagrammatically illustrate the steps taken during the wrapping of the bundle. The bundle 225 is usually placed on a lower wrapping sheet 226 before reaching the machine. The bundle and the lower wrapper are directed on to the rollers of table 10 at one end thereof and moved longitudinally of the table until the bundle is positioned centrally thereof over the platform 28 and flange 30. Then the upper wrapper sheet 227 is applied to the top of the bundle. This forms a sandwich as shown in Figure 13. At this time, the ends of the bundle should be facing the sides of the table. The bundle and the lower wrapper may be directed on to the table with the bundle ends facing the table sides, but if said ends are out of position, the bundle and wrapper may be elevated by platform 28 and flange 30 so that it may easily be turned to the proper position. The folders 60 at opposite end of the table are raised by the hydraulic means associated therewith and this folds the sides 230 and 231 of the lower wrapper 226 upwardly along the sides of the bundle, as shown in Figure 14.

The flat folding members of these folders normally lie in open positions or in angular positions relative to vertical planes passing through the pivots thereof. As folders 60 move upwardly, the fingers 68 thereof engage the stops 77 to cause their folding members to swing into vertical planes, thus closing the folding members. This closing or swinging action folds the sides of the lower wrapper upwardly. The stops 77 may be omitted if the bundles are relatively heavy, in which case fingers 68 would engage the bundle bottom. However, with the illustrated arrangement, the folders are not dependent upon the bundle for operation and, in fact, they may centre the bundle when they operate.

The two horizontal corner folders 140 are lowered and this folds the sides 234 and 235 of the upper wrapper downwardly over the sides of the bundle and, in this example, over the sides 230 and 231 of the lower wrapper. The rollers 156 of these folders engage the top of the bundle causing their folding members 153 and the folding plate 160 to close by swinging downwardly into a vertical plane, and this folds the wrapper sides downwardly. Figure 14 shows the sides of the lower and upper wrappers folded against the adjacent sides of the bundle where they are held by the various folders.

Figure 15:
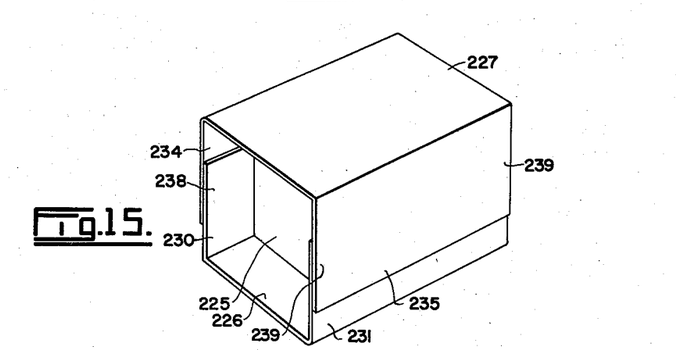
Figure 16:
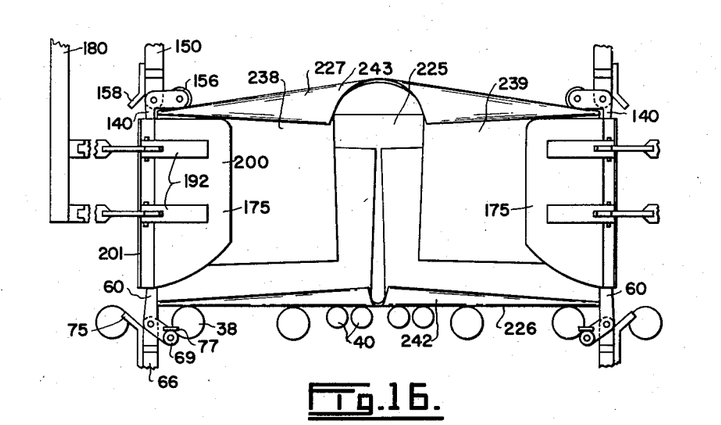
Figure 17:
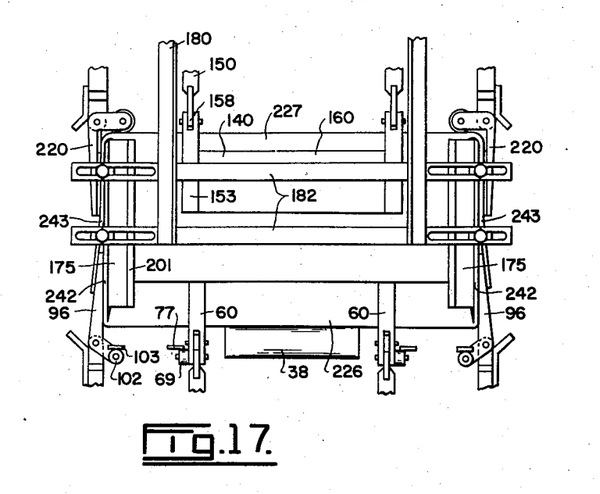

At this time, the two wrapper sheets are folded around the bundle in the form of a tube. Figure 15 shows this tubular formation with the various folders removed.

The two pairs of vertical corner folders 175 at the opposite sides of the bundle are now swung downwardly towards the latter. At this time, the arms 180 swing about the shafts 178. As each folder approaches the bundle, the bearing surface 201 thereof engages the side of the bundle, causing the normally-open plate 200 to close or swing against the side of the portions of the two wrappers projecting beyond the adjacent bundle end. This folds or tucks these side portions inwardly over the bundle ends, one such end being illustrated in Figure 16. The sides 238 and 239 of the projecting part of the tube have been folded inwardly over the end of the bundle. This leaves lower and upper flaps 242 and 243 projecting from each bundle end at the bottom and top thereof, respectively.

The folders 96 are moved upwardly at one end of the bundle while folders 96 at the opposite end thereof are also moved upwardly. These folders fold the lower flaps 242 upwardly against the bundle ends, see Figure 17. Then the horizontal corner folders 220 are lowered and these function in the same manner as folders 140 to fold the flaps 243 downwardly over the bundle ends.

The bundle is now completely wrapped, and the various holders hold the folded wrapper sheets in position. Any securing means may now be employed to hold the wrapper in place. Gummed tape, flat steel bands, or bale wires may be applied to the bundle. For example, a plurality of bale wires may be run longitudinally around the bundle and be firmly secured in place by suitable baling equipment. This will hold the end flaps 242 and 243 in place so that all the folders may be retracted. Then the platform 28 and flange 30 are elevated by hydraulic equipment associated therewith. This lifts the bundle clear of the table rollers so that it may be turned to a position at right angles to its first position. Following this, a plurality of bale wires may be applied to the bundle extending therearound at right angles to the other wires.

Figure 11:
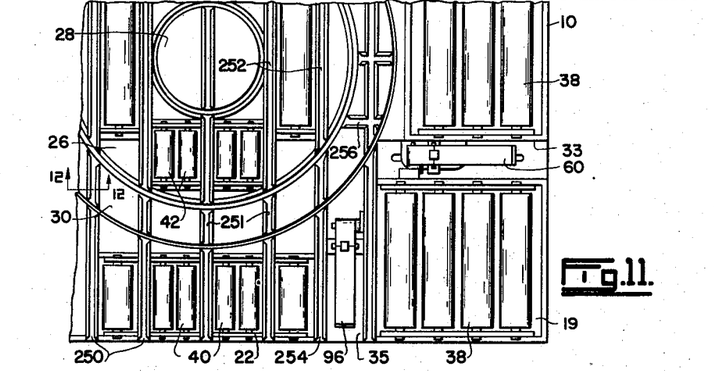
Figure 11 is a fragmentary plan view of an alternative form of table.
Figure 12:
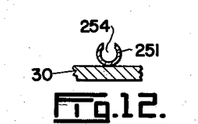

Figure 11 shows a table 10 having a plurality of tubes 250 in the side section 22 of the table which are aligned with tubes 251 on the flange 30 and tubes 252 in the stationary central portion 26 of the table. These tubes have slots 254 extending from end to end thereof in their upper surfaces, see also Figure 12. Additional tubes 250 are located in table section 23, not shown.

All of these tubes are located below the upper surfaces of the various rollers of the table, and wires may be slipped through them for baling purposes. The flange 30 also has similar tubes 256 at right angles to tubes 251 so that the former come into line with tubes 250 and 252 when the flange is moved to a position at right angles to its normal position.

What I claim as my invention is:

1. In wrapper applicating apparatus, a folder comprising a movably mounted holder, a folding member pivotally mounted at an end thereof on the holder, a finger projecting outwardly from the folding member at the pivot thereof and substantially at right angles thereto, said member and finger normally opening outwardly from the holder in the form of a V, a stop carried by the holder immediately behind the member, and resilient means connected to the folding member and the holder normally retaining the former against the stop in a V-shaped open position, said finger engaging an object when the holder is moved in one direction to swing the folding member about its pivot away from the stop into a closed position in line with the holder and the resilient means moving the member into the open position back against the stop when the holder is moved in the opposite direction.

2. Wrapper applicating apparatus as claimed in claim 1 including a roller at the outer end of the finger for engaging the object.

3. In wrapper applicating apparatus, a folder comprising a movably mounted supporting arm, a plurality of elongated folding members pivotally supported at their ends by the ends of the arm, a finger projecting outwardly from each folding member at the pivot thereof and substantially at right angles thereto, each member and its finger normally opening outwardly from the holder in the form of a V, a stop behind each member, and resilient means normally retaining the folding members against their respective stops in a V-shaped open position, said fingers engaging an object when the supporting arm is moved in one direction to swing the folding members about their pivots away from the stops into a closed position and the resilient means moving the members into the open position back against the stops when the arm is moved in the opposite direction.

4. Wrapper applicating apparatus as claimed in claim 3 including a plate extending between and connected to the folding members.

5. In wrapper applicating apparatus, a folder comprising a swingably mounted arm, a supporting arm connected to and extending across the first arm, a folding member pivotally mounted at an end thereof on the supporting arm, a finger projecting outwardly from the folding member at the pivot thereof and substantially at right angles thereto, said member and finger normally opening outwardly from the supporting arm in the form of a V, a stop immediately behind the member, and resilient means normally retaining the folding member against the stop in a V-shaped open position, said finger engaging an object when the first arm is moving in one direction to rotate the folding member about its pivot away from the stop into a closed position and the resilient means moving the member into the open position back against the stop when the first arm is moving in the opposite direction.

6. Wrapper applicating apparatus as claimed in claim 5 in which the folding member is adjustably mounted on the supporting arm for movement longitudinally thereof.

7. In wrapper applicating apparatus, a folder comprising a swingably mounted arm, a supporting arm connected to and extending across the first arm, folding members pivotally supported at their ends by the ends of the supporting arm, a finger projecting outwardly from each folding member at the pivot thereof and substantially at right angles thereto, each member and its finger normally opening outwardly from the supporting arm in the form of a V, a stop behind each member, and resilient means normally retaining the folding members against their respective stops in a V-shaped open position, said fingers engaging an object when the first arm is swung in one direction to swing the folding members about their pivots away from the stops into a closed position and the resilient means moving the members into the open position back against the stops when the first arm is swung in the opposite direction.

8. Wrapper applicating apparatus as claimed in claim 7 in which the folding members are adjustably mounted on the supporting arm for movement towards and away from each other.

9. In wrapper applicating apparatus, a folder comprising a swingably mounted arm, a pair of spaced supporting arms connected to and extending across the first arm, folding members pivotally supported at their ends by the ends of each supporting arm, a finger projecting outwardly from each folding member at the pivot thereof and substantially at right angles thereto, each member and its finger normally opening outwardly from its supporting arm in the form of a V, a stop behind each member, a plate extending between and connected to the folding members at adjacent ends of the supporting arms, said joined folding members forming pairs at opposite ends of the supporting arms, and resilient means retaining each pair of joined folding members against their respective stops in a V-shaped open position, said fingers engaging an object when the first arm is swung in one direction to swing the folding members about their pivots away from the stops into a closed position and the resilient means moving the members into the open position back against the stops when the first arm is swung in the opposite direction.

10. Wrapper applicating apparatus as claimed in claim 9 in which each of the folding members is adjustably mounted on its supporting arm and the joined pairs of members at the ends of said arms are movable towards and away from each other.

11. In wrapper applicating apparatus, a table for supporting a bundle with a lower wrapping sheet therebeneath, said sheet extending beyond the bundle edges, at least one slot in the table extending to the bundle position, and a folder mounted beneath at least one slot; said folder comprising a holder, a folding member pivotally supported adjacent its lower end by the holder, a finger projecting outwardly from the folding member in line with the table slot near the pivot thereof and substantially at right angles thereto, a stop for retaining the folding member at an angle to the vertical, resilient means connected to the folding member normally retaining it in an open position against the stop, and means connected to the holder for selectively reciprocating said holder to move the folding member upwardly through the slot and back again, said finger engaging an object when the holder is moved upwardly to swing the folding member about its pivot towards an edge of the bundle to a closed position against said edge, said movement of the member folding a portion of the wrapping sheet against the bundle edge, and the resilient means moving the folding member into the open position against the stop when the holder is moved downwardly.

12. In wrapper applicating apparatus, a table for supporting a bundle with a lower wrapping sheet therebeneath, said sheet extending beyond the bundle edges, at least one pair of spaced slots in the table extending to the bundle position, and a folder mounted beneath at least one pair of slots; said folder comprising a supporting arm, aligned folding members pivotally supported adjacent their lower ends by the ends of the arm, there being one member beneath each of a pair of slots, a finger projecting outwardly from each folding member in line with the table slot above the latter, said fingers being aligned, each finger being near the pivot of its member and extending substantially at right angles to said member, a stop for retaining each folding member at an angle to the vertical, resilient means connected to each folding member normally retaining it in an open position against its stop, and means connected to the supporting arm for selectively reciprocating said arm to move the folding members upwardly through the slots thereabove and back again, each of said fingers engaging an object when the arm is moved upwardly to swing its folding member about the pivot thereof towards an edge of the bundle to a closed position against said edge, said movement of the members folding a portion of the wrapping sheet against the bundle edge, and the resilient means moving the folding members into the open position against their stops when the arm is moved downwardly.

13. Wrapper applicating apparatus as claimed in claim 12 in which the object engaged by each finger is a stop normally above and in line with said finger.

14. In wrapper applicating apparatus, a table for supporting a bundle with an upper wrapping sheet on the top thereof and extending beyond its edges, and a folder suspended above the bundle position over a bundle edge; said folder comprising a downwardly-projecting holder, a folding member pivotally supported at its upper end by the holder, a finger projecting outwardly from the folding member at the pivot thereof and substantially at right angles thereto, a stop for retaining the folding member at an angle to the vertical, resilient means connected to the folding member normally retaining it in an open position against the stop, said member and finger normally opening downwardly from the holder in the form of a V, and means connected to the holder for selectively reciprocating said holder to move the folding member downwardly towards the bundle position and back again, said finger engaging a portion of the sheet overlying the top of the bundle when the holder is moved downwardly to swing the folding member about its pivot away from the stop towards an edge of the bundle to a closed position against said edge, said movement of the member folding a portion of the wrapping sheet against the bundle edge, and the resilient means moving the folding member into the open position back against the stop when the holder is moved upwardly.

15. Wrapper applicating apparatus as claimed in claim 14 including a carriage mounted for horizontal movement above the table, said carriage carrying the holder and the reciprocating means.

16. In wrapper applicating apparatus, a table for supporting a bundle with an upper wrapping sheet on the top thereof and extending beyond its edges, and a folder suspended above the bundle position over a bundle edge; said folder comprising a horizontal supporting arm, aligned folding members pivotally supported at their upper ends by the ends of the arm, aligned fingers projecting outwardly from the folding members at the pivots thereof and substantially at right angles thereto, a stop for retaining each folding member at an angle to the vertical, resilient means connected to each folding member normally retaining it in an open position against its stop, each of said members and its finger normally opening downwardly in the form of a V, and means connected to the supporting arm for selectively reciprocating said arm to move the folding members downwardly towards the bundle position and back, said fingers engaging portions of the sheet overlying the top of the bundle when the arm is moved downwardly to swing the folding members about their pivots away from the stops towards an edge of the bundle to a closed position against said edge, said movement of the members folding a portion of the wrapping sheet against the bundle edge, and the resilient means moving the folding members into the open position back against their stops when the arm is moved upwardly.

17. Wrapper applicating apparatus as claimed in claim 16 including a plate extending between and connected to the folding members.

18. In wrapper applicating apparatus, a table for supporting a bundle with an upper wrapping sheet on the top thereof and extending beyond its edges, and a folder suspended above the bundle position over a bundle edge; said folder comprising an arm pivotally mounted at one end above the table, said arm normally lying at an angle to the vertical and terminating above the table when in a vertical position, a folding member pivotally supported adjacent its upper end by the arm near the free end of the latter, a finger projecting outwardly from the folding member near the pivot thereof and substantially at right angles thereto, a stop for retaining the folding member at an angle to the vertical, resilient means connected to the folding member normally retaining it in an open position against the stop, and means connected to the arm for selectively swinging it to substantially a vertical position and back again, said finger engaging a side of the bundle when the arm is swung downwardly to swing the folding member about its pivot around a bundle corner to a closed position against the bundle end, and the resilient means moving the folding member into the open position against its stop when the arm is swung upwardly.

19. In wrapper applicating apparatus, a table for supporting a bundle with an upper wrapping sheet on the top thereof and extending beyond its edges, and a folder suspended above the bundle position over a bundle edge; said folder comprising an arm pivotally mounted at one end above the table, said arm normally lying at an angle to the vertical and terminating above the table when in a vertical position, a supporting arm connected to and extending across the first arm, a folding member pivotally supported adjacent its upper end by the supporting arm, said member being mounted for adjustment longitudinally of the supporting arm, a finger projecting outwardly from the folding member near the pivot thereof and substantially at right angles thereto, a stop for retaining the folding member at an angle to the vertical, resilient means connected to the folding member normally retaining it in an open position against the stop, and means connected to the first arm for selectively swinging it to substantially a vertical plane and back again, said finger engaging a side of the bundle when the first arm is swung downwardly to swing the folding member about its pivot around a bundle corner to a closed position against the bundle end, and the resilient means moving the folding member into the open position against its stop when the first arm is swung upwardly.

20. In wrapper applicating apparatus, a table for supporting a bundle with an upper wrapping sheet on the top thereof and extending beyond its edges, and a folder suspended above the bundle position over a bundle edge; said folder comprising an arm pivotally mounted at one end above the table, said arm normally lying at an angle to the vertical and terminating above the table when in a vertical position, a supporting arm connected to and extending across the first arm, folding members pivotally supported adjacent their upper ends by the ends of the supporting arm, said members being mounted for adjustment on the supporting arm towards and away from each other, a finger projecting outwardly from each folding member near the pivot thereof and substantially at right angles thereto, a stop for retaining each folding member at an angle to the vertical, resilient means connected to each folding member normally retaining it in an open position against its stop, and means connected to the first arm for selectively swinging it to substantially a vertical position and back again, said fingers engaging the same side of the bundle when the first arm is swung downwardly to swing the folding members about their pivots around bundle corners to closed positions against opposite bundle ends, and the resilient means moving the folding members into the open positions against their stops when the first arm is swung upwardly.

21. In wrapper applicating apparatus, a table for supporting a bundle with an upper wrapping sheet on the top thereof and extending beyond its edges, and a folder suspended above the bundle position over a bundle edge; said folder comprising an arm pivotally mounted at one end above the table, said arm normally lying at an angle to the vertical and terminating above the table when in a vertical position, a pair of spaced supporting arms connected to and extending across the first arm, folding members pivotally supported adjacent their upper ends by the ends of each supporting arm, a finger projecting outwardly from each folding member near the pivot thereof and substantially at right angles thereto, a plate extending between and connected to the folding member at opposite ends of the supporting arms, a stop for retaining each pair of folding members at an angle to the vertical, resilient means connected to each pair of members normally to retain them in an open position against their stop, and means connected to the first arm for selectively swinging it to substantially a vertical position and back again, said fingers engaging the same side of the bundle when the first arm is swung downwardly to swing the folding members about their pivots around bundle corners to closed positions against opposite bundle ends, and the resilient means moving the folding members into the open positions against their stops when the first arm is swung upwardly.

22. Wrapper applicating apparatus as claimed in claim 21 in which each pair of folding members are adjustably mounted on their respective supporting arms and the joined pairs are movable towards and away from each other.

23. Wrapper applicating apparatus as claimed in claim 21 including a carriage mounted for horizontal movement above the table, said folder and the swinging means of the first arm being mounted on the carriage, and said carriage being movable in a direction substantially at right angles to the pair of supporting arms.

24. In wrapper applicating apparatus, a folder comprising a swingably mounted arm, a pair of spaced supporting arms connected to and extending across the first arm, folding members pivotally and adjustably mounted on the ends of each supporting arm, the pivot of each folding member being at an end thereof, a finger projecting outwardly from each folding member at the pivot thereof and substantially at right angles thereto, each member and its finger normally opening outwardly from its supporting arm in the form of a V, a stop immediately behind at least one member, a plate extending between and connected to the folding members at adjacent ends of the supporting arms, said joined folding members forming pairs at opposite ends of the supporting arms movable towards and away from each other along said arms, and resilient means retaining each pair of joined folding members in an open position with the member adjacent the stop against the latter, said fingers engaging an object when the first arm is swung in one direction to swing the folding members about their pivots into a closed position and the resilient means moving the members into the open position when the first arm is swung in the opposite direction.

References Cited in the file of this patent
UNITED STATES PATENTS

| | | |
|---|---|---|
| 1,153,571 | Redd | Sept. 14, 1915 |
| 1,515,311 | Milmoe | Nov. 11, 1924 |
| 2,050,268 | Bronander | Aug. 11, 1936 |